(12) United States Patent
Rios

(10) Patent No.: US 6,799,784 B2
(45) Date of Patent: Oct. 5, 2004

(54) FOLDING UTILITY TRUCK RACK WITH SIDE PANELS AND LOCKING BED COVER

(76) Inventor: Antonio Santiago Rios, 3901 Georgia St., Vallejo, CA (US) 94591

(*) Notice: Subject to any disclaimer, the term of this patent is extended or adjusted under 35 U.S.C. 154(b) by 0 days.

(21) Appl. No.: 10/161,389

(22) Filed: May 31, 2002

(65) Prior Publication Data
US 2002/0149219 A1 Oct. 17, 2002

Related U.S. Application Data

(63) Continuation-in-part of application No. 09/567,209, filed on May 9, 2000.

(51) Int. Cl.[7] .................................................. B60P 3/34
(52) U.S. Cl. ........................ 296/26.06; 296/100.07; 296/3; 296/26.04
(58) Field of Search .................. 296/26.06, 100.07, 296/10, 3, 26.04, 100.06; 224/310; 280/748

(56) References Cited

U.S. PATENT DOCUMENTS

| | | | | |
|---|---|---|---|---|
| 3,765,717 A | * | 10/1973 | Garvert | 296/100.07 |
| 3,841,690 A | * | 10/1974 | Piercy | 296/10 |
| 3,995,890 A | * | 12/1976 | Fletcher | 296/26.06 |
| 4,261,611 A | * | 4/1981 | Barry et al. | 296/100.07 |
| 4,405,170 A | * | 9/1983 | Raya | 296/3 |
| 4,531,775 A | * | 7/1985 | Beals | 296/26.06 |
| 4,815,786 A | * | 3/1989 | McRay | 296/26.06 |
| 5,009,457 A | * | 4/1991 | Hall | 296/3 |
| 5,037,152 A | * | 8/1991 | Hendricks | 296/26.06 |
| 5,110,021 A | * | 5/1992 | Dawson, Jr. | 296/26.06 |
| 5,316,357 A | * | 5/1994 | Schroeder | 296/26.04 |
| 5,476,301 A | * | 12/1995 | Berkich | 296/3 |
| 5,564,773 A | * | 10/1996 | Lapsley et al. | 296/100.06 |
| 5,628,540 A | * | 5/1997 | James | 296/3 |
| 6,076,881 A | * | 6/2000 | Tucker | 296/100.07 |
| 6,176,540 B1 | * | 1/2001 | Whittaker | 296/100.07 |
| 6,224,140 B1 | * | 5/2001 | Hoplock | 296/100.07 |
| 6,332,637 B1 | * | 12/2001 | Chambers | 296/26.04 |
| 6,394,524 B1 | * | 5/2002 | Morse | 296/26.06 |
| 6,505,875 B1 | * | 1/2003 | Laper | 296/26.06 |
| 6,520,393 B1 | * | 2/2003 | Ferguson | 224/310 |
| 2003/0011180 A1 | * | 1/2003 | Coffman et al. | 280/748 |

* cited by examiner

Primary Examiner—Kiran Patel
(74) Attorney, Agent, or Firm—John P. Luther; Newman & Newman LLP

(57) ABSTRACT

A truck storage rack system that allows quick assembly and disassembly of the rack having a minimum number of components. The rack includes side panels that contain tall or bulky materials during transport. The rack includes collapsible support members that locks the rack in place and protects the rear cab window. The support members easily lock unto the side panels allowing full storage capacity for the truck bed.

4 Claims, 5 Drawing Sheets

FOLDING UTILITY TRUCK RACK WITH SIDE PANELS AND LOCKING BED COVER

CROSS REFERENCE TO RELATED APPLICATIONS

This application is a continuation-in-part of U.S. patent application Ser. No. 09/567,209, filed on May 9, 2000 entitled Folding Utility Truck Rack with Side Pannels and Locking Bed Cover.

FIELD OF INVENTION

The present invention relates to trucks rack systems. More specifically, to a convertible truck rack system which require minimal labor to assemble and disassemble. These systems allow a normal sized pickup or utility truck to substantially increase its payload of materials, without a permanent framing.

BACKGROUND OF THE INVENTION

In the transport of goods such as, limber equipment, plumbing implements, and machinery, which either is to long to fit in the bed of a pickup truck or top heavy, has been a continued problem. Tipping, loss of control, and spillage of materials are just some of the driving hazards associated with ill loaded pickup trucks. The body of conventional pickup trucks or trailer racking systems, are useful in supporting small loads however they are woefully insufficient for long or tall loads. By combining runners and rack assemblies together, the bed of the trucks may support the loads on paved, gravel, or rugged surfaces. The present systems have been found to be costly, inadequate, cumbersome, and limited the load size due to the structural weight of the systems. In the available fixed rack systems there is no canopy protection. The racks cannot be collapsed, with drag and high fuel consumption also an ongoing concern. More specifically, wagons or pickup trucks having fixed rack systems are not useful while movably carrying or supporting bulky items.

Security is also an issue with both fixed rack and conventional rack systems. Most systems do not provide back panel doors for locking up goods while in the erect position. Therefore, a longstanding need has existed to provide a novel utility multi-use collapsible or folding truck rack with side panels and locking bed cover, which includes a strong and sturdy base for supporting and transporting heavy, bulky and long materials and equipment.

This is illustrated in U.S. Pat. No. 3,589,576 issued to James L. Rinkle on Jun. 29, 1971, which discloses a collapsible rack system. In that system only a tarp is contemplated to provide security for the goods. Additionally, the system is configured much like a jig saw puzzle. The system has 38 or more components that must be in their correct position for the system to work. Moreover, in the disassembled position these components are bulky and reduce storage space.

Morris, Knaack et al, and Burke et al disclose similar rack frame systems for pickup trucks in U.S. Pat. Nos. 4,906,038, 4,509,787, and 4,770,458 respectively. They encounter the same problems as described above.

The convertible system as disclosed in U.S. Pat. No. 3,765,717 issued to Clarence F. Garvert patented on Oct. 16, 1973, shows a system which opens to have side panels. However, these panels are not contemplated to provide support for top sided loads. The supply boxes prevent and limit the size and shape of goods that fit into the truck bed. In addition, there is no adequate support for the panels to be raised during transport, nor is there rear and front panel guards.

David L. McCray in U.S. Pat. No. 4,815,786 patent on Mar. 28, 1989 discloses a convertible camper system that requires the system be cranked into place. This limits the height of the goods that may be transported.

The present invention overcomes the problems associated with the systems as disclosed above by providing an improved collapsible, foldable multi-use truck racking system. Additionally, the system in its collapsed position does not prevent normal use or loading of equipment, while acting as a secure locking bed cover.

SUMMARY OF THE INVENTION

The present invention includes an interlocking frame covered by side panels providing a base for the novel racking system in its assembled position. The front and back ends have detachable main load carrying rails. Foldable pivoting horizontal side rails support the opposite sides of the panels in a locked position. An additional canvas can be stretched across the panels in their upright position to protect the loads from the elements.

Therefore, it one of the primary objectives of the invention to provide a multi-use, sturdy, and durable collapsible truck rack system for the transport of materials.

It is another objective of the invention to provide a truck loading system to allow standard pick-up trucks to efficiently carry odd shaped or long loads while giving support.

Another object of the invention is to provide a collapsible truck framing system.

It is an object of the invention to provide a covered truck bed system that converts easily to a top loader.

It is a further object of the invention to allow pickup trucks to support and carry top-heavy loads over gravel, smooth, and sandy surfaces without fear of tipping, or loss of control.

Other features and advantages of the present invention will be apparent from the following description in which the preferred embodiments have been set forth in conjunction with the accompanying drawings.

BRIEF DESCRIPTION OF THE DRAWINGS

The accompanying drawings, which are incorporated in and form part of the specification, illustrate an embodiment of the present invention and together with the description, serve to explain the principles of the invention. In the drawings.

DETAILED DESCRIPTION OF THE INVENTION

Figure 1:
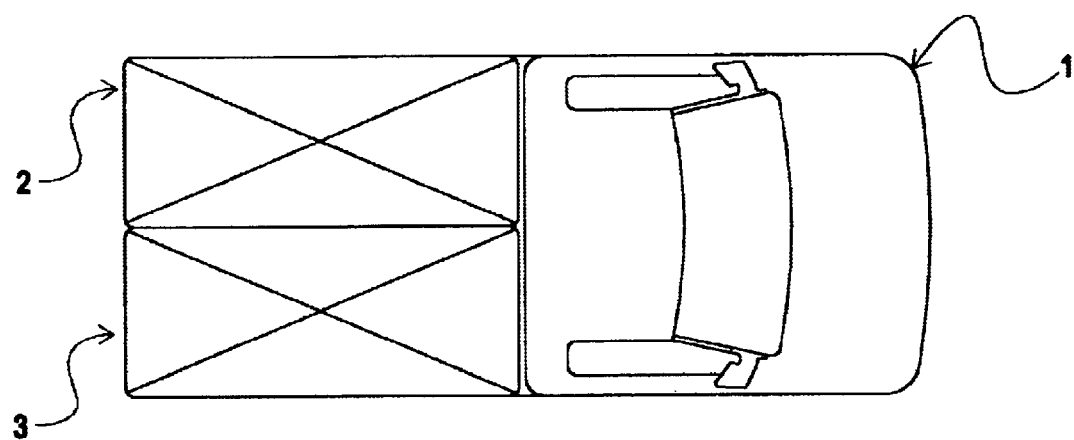
FIG. 1 shows a top view of the invention mounted on truck bed.
Figure 2:
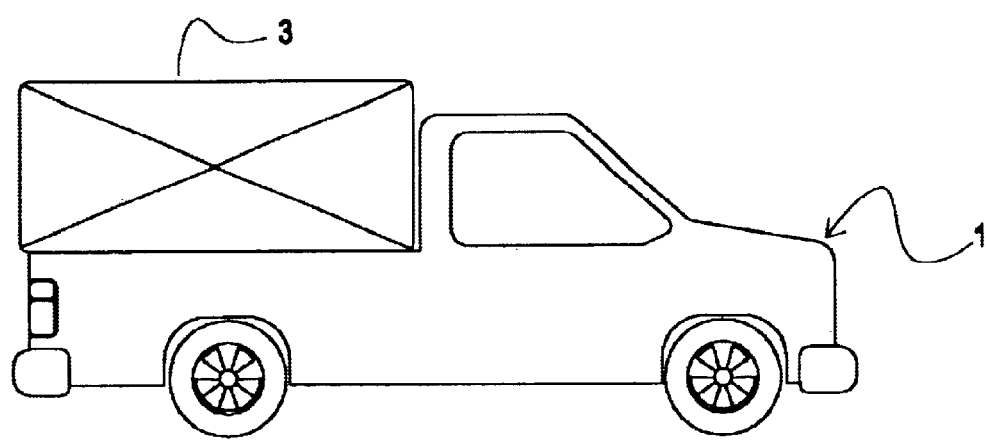
FIG. 2 shows the invention with a side panel extended.
Figure 3:
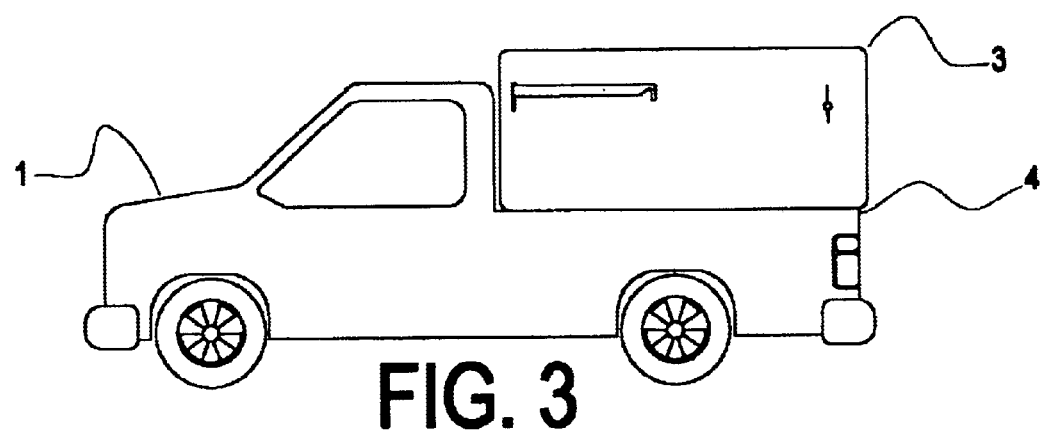
FIG. 3 shows an opposite side view of the panel extended.
Figure 4:
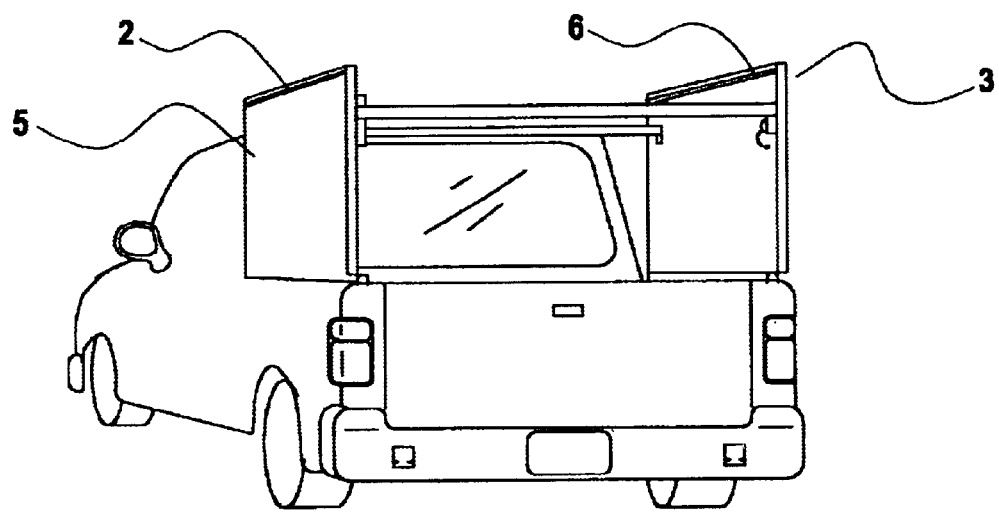
FIG. 4 shows the rear profile of the invention.
Figure 5:
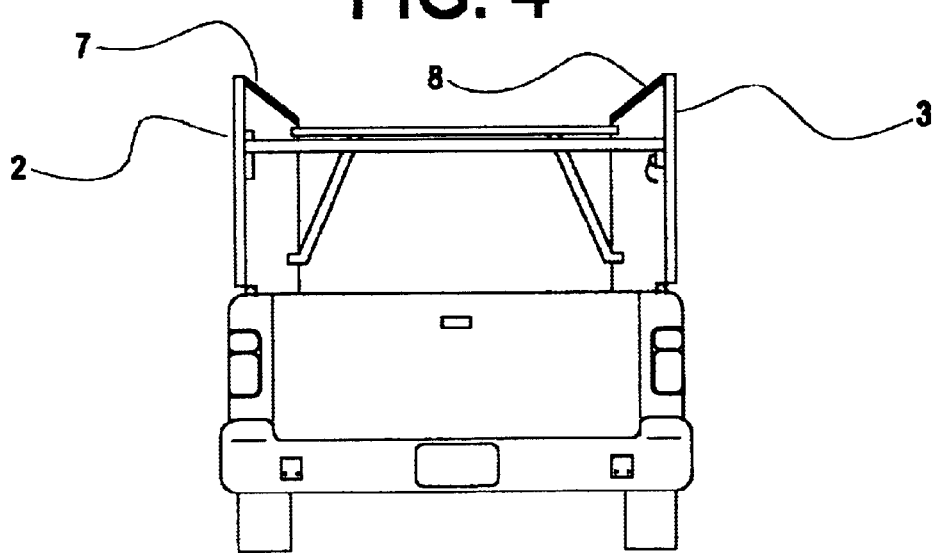
FIG. 5 show the invention with both panels extended.
Figure 6:
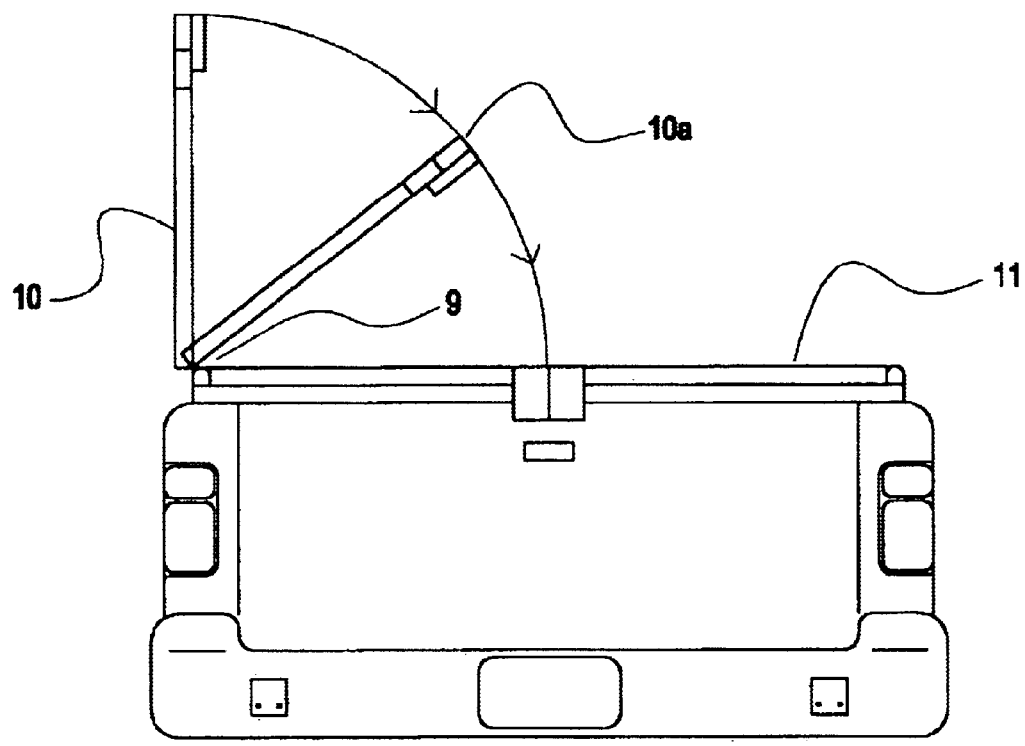
FIG. 6 shows the panel interlocking arrangement.

The invention has been described in detail with particular reference to certain preferred embodiments thereof, but it will be understood that variations and modifications can be effected within the spirit and scope of the invention.

Referring to FIGS. 1–6 the truck (1) is shown with the left (2) and right (3) panels in the locked bed cover position. The left and right panels (2 and 3) can be lifted allowing storage materials to be place inside of the truck bed (4). The panels (2 and 3) can be closed and locked securing any small materials within. The panels (2 and 3) have mated interlocking grooves (5 and 6) on its inner edges (7 and 8) that provide a weather tight fit. The panels (2 and 3 are adapted to receive a combination or keyed lock. Additionally, the panels have pivoted hinges (9) that secure and allow the panels (2 and 3) to freely move into position. The panels (2 and 3) may be constructed of any metal, plastic, or fiberglass material that provides a strong and sturdy support base.

Figure 7:
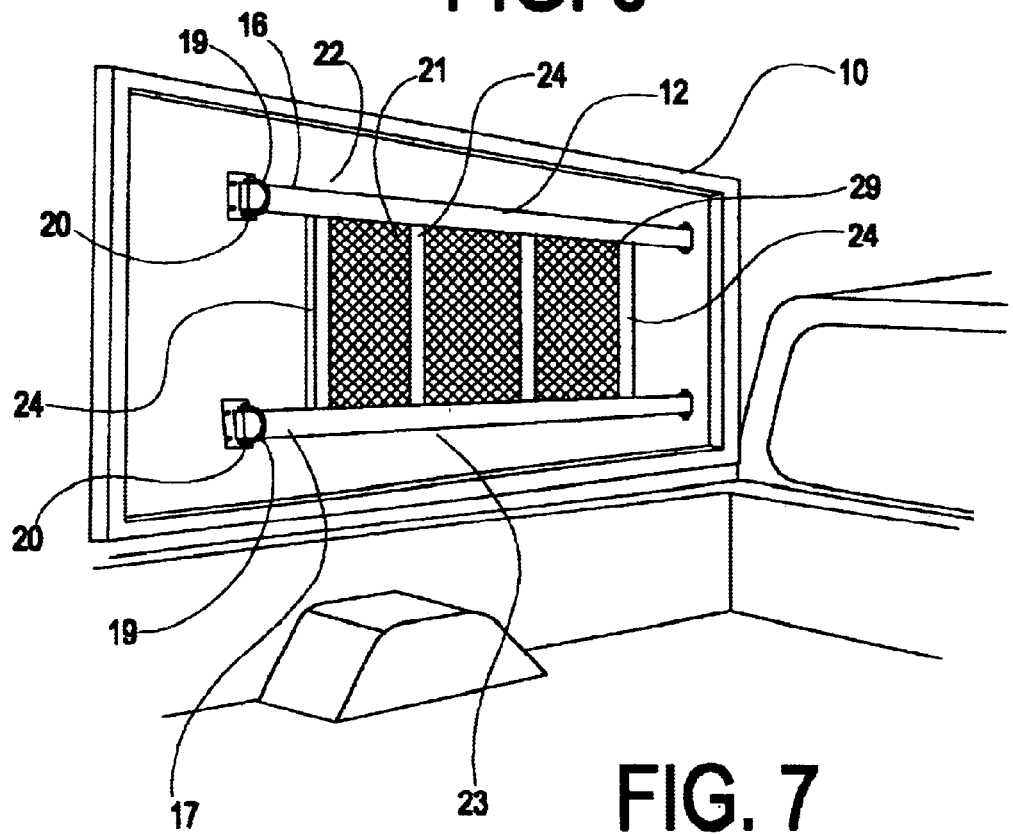
FIG. 7 shows a detail of the left side panel.
Figure 7A:
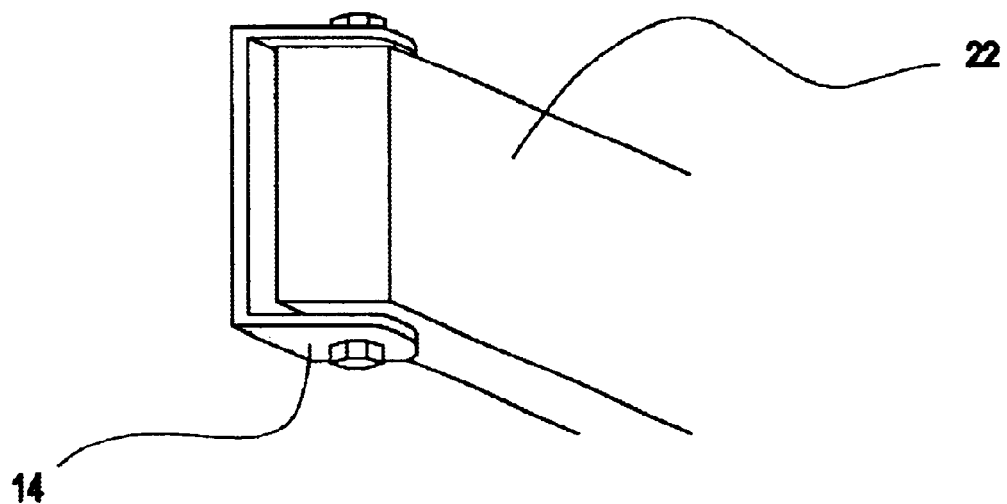
FIG. 7a shows a detail of the fixed hinge.
Figure 7B:
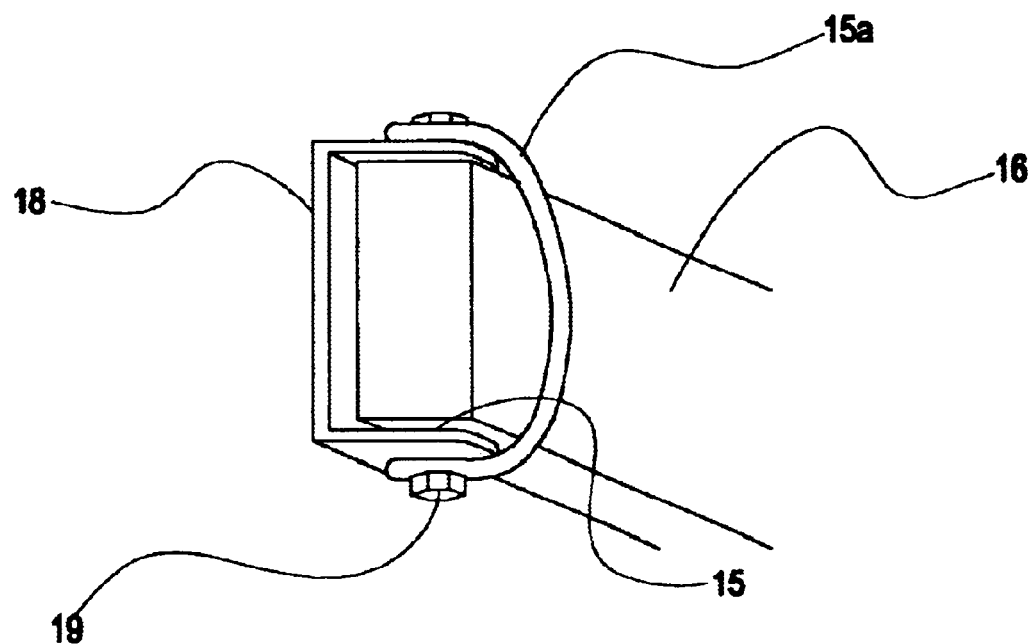
FIG. 7b shows a detail of the cotter pin arrangement.
Figure 8:
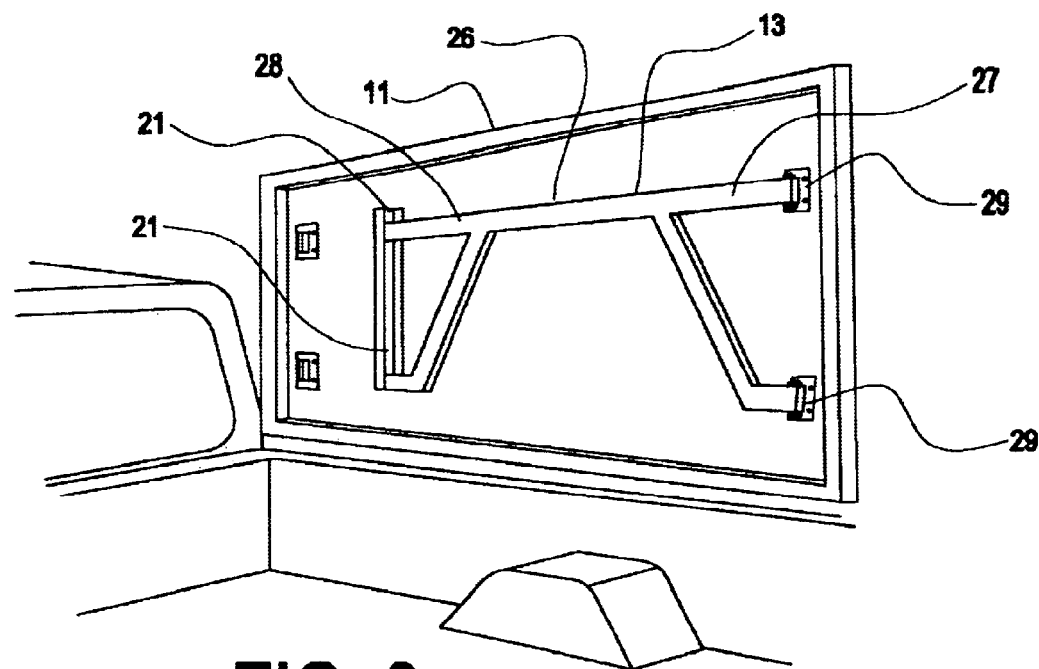
FIG. 8 shows a detail of the right side panel.

FIGS. 7–8 show details of the left (10) and right (11) panels. The panels (10 and 11) carry front and rear support members (12 and 13 respectively). With respect to left panel (10), the front collapsible support member (12) is attached at one end to the framing of panel (10) using a fixed hinge (14). The other end is attached to the framing with a quick release cotter pin arrangement (15). The quick release cotter pin arrangement include a cotter pin strap (15a) and a cotter pin (19). The side panels (10, and 11) have a crimp and groove locking arrangement providing weather tight fit for the panels (10, and 11) when not extended. Right panel (11) has a crimp (not shown) which seats into the groove (10a) of left panel (10). As shown in FIGS. 7, and 8 the front support member (12) consists of two extending metal pieces (22, and 23) having metal pieces (24) connecting extending metal pieces (22, and 23). A lattice (21) is provided between metal pieces (24) and connected to both extending metal pieces 22, and 23). The end railings (16 and 17) of the support member (12) fit into seats (18). Holes (20) in the railings (16 and 17) and seat (18) allow pins (19) to secure the collapsible support member (12). The rear support member (13) consists of an extending frame member (26), forming dual y-shaped ends (27, and 28). Right panel (11) has the rear support member (13) attached by a similar fixed hinge (29) at one end (27) and cotter pin arrangement (21) at the other end (28).

Figure 9:
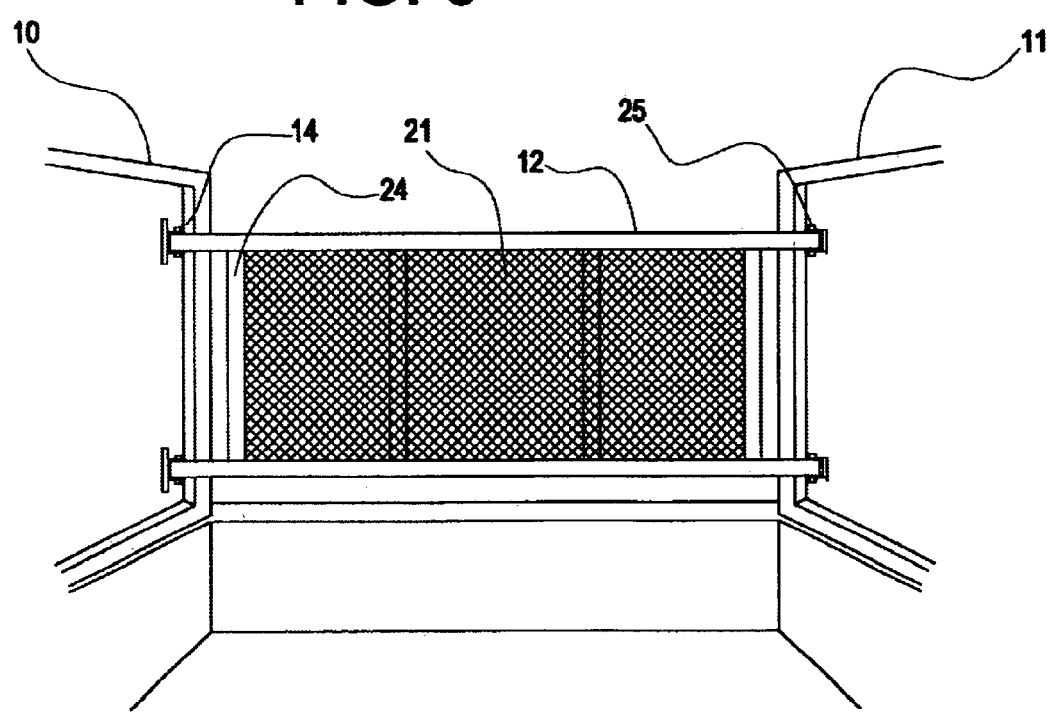
FIG. 9 shows a detail of the front support.

In operation, the side panels (10, and 11) are extended vertically. The front support member (12) is extended by releasing the cotter pin (15a) and aligning holes (20) with set of seats (25) attached to the opposite side panel (11). The rear support member (13) is then extended rearward and locked into place with cotter pin arrangement (15) of side panel (10). Once extended, the front and rear support members (12, and 13) provide a secure and stable load area for the truck bed. The front support member (12) also protects the rear glass of the truck cab from accidental breakage. FIG. 9 shows the front support member (11) properly extended and connected at its fixed hinges (14) and at it's the seat arrangement (25) of side panel (11).

The foregoing description of the preferred embodiment of the invention has been presented for purposes of illustration and description. It is not intended to be exhaustive or to limit the invention to the precise form disclosed, and obviously many modifications and variations are possible in light of the above teaching.

Parts List

1. Truck
2. Left Panel
3. Right Panel
4. Truck Bed
5. Left Groove
6. Right Groove
7. Left Edge
8. Right Edge
9. Pivoted Hinges
10. Left Panel
10a. Left Panel Groove
11. Right Panel
12. Front Support Member
13. Rear Support Member
14. Fixed Hinge
15. Quick Release Cotter Pin Arrangement
15a. Cotter Pin Strap
16. End Railing
17. End Railing
18. Seat
19. Pins
20. Holes
21. Lattice
22. Extending Metal Piece
23. Extending metal Piece
24. Metal Piece
25. Seats
26. Extending Frame Member
27. Y-Shaped End
28. Y-Shaped End The embodiments of the invention in which an exclusive property or privilege is claimed are defined as follows:

1. A cover for a truck bed that converts to a rack for transporting materials comprising:

a left side panel having an inner and outer edge and said outer edge being attached to the left side of said truck bed, and a front collapsible support member attached to said panel by a fixed hinge on one end of said collapsible support member and a quick release cotter pin on the other end;

a right side panel having an inner and outer edge and said outer edge is attached to the right side of said truck bed and wherein said left panel further comprises a rear collapsible support member attached to said panel by a fixed hinge on one end of said collapsible support member and a quick release cotter pin on the other end;

said left and right panels having an opened and closed position whereby in said closed position said inner edges of the left and right panels fit together creating a weather tight closure for the truck bed; and wherein when said left and right side panels are in an open position said front collapsible support member is released by said quick release cotter pin arrangement and extended forward and said rear collapsible support member is extended rearward and locked to said left side panel using the quick released cotter pin arrangement.

2. The apparatus as recited in claim 1 wherein said left and right side panels are attached to said truck bed by a hinge which allows the left and right side panels to swing into the open and closed positions.

3. The apparatus as recited in claim 2 whereby said front collapsible support member further comprises an upper framing member connected to a lower framing member a plurality of support members connect said upper and lower framing members and a lattice panel is deposed between said upper and lower framing members.

4. The apparatus as recited in claim 3 wherein said quick release cotter pin arrangement comprises a cotter pin securing ring and a cotter pin.

* * * * *